July 2, 1968 G. H. SMITH 3,390,767
SURFACE FORM INSPECTION APPARATUS AND METHOD
Filed June 17, 1965 5 Sheets-Sheet 1
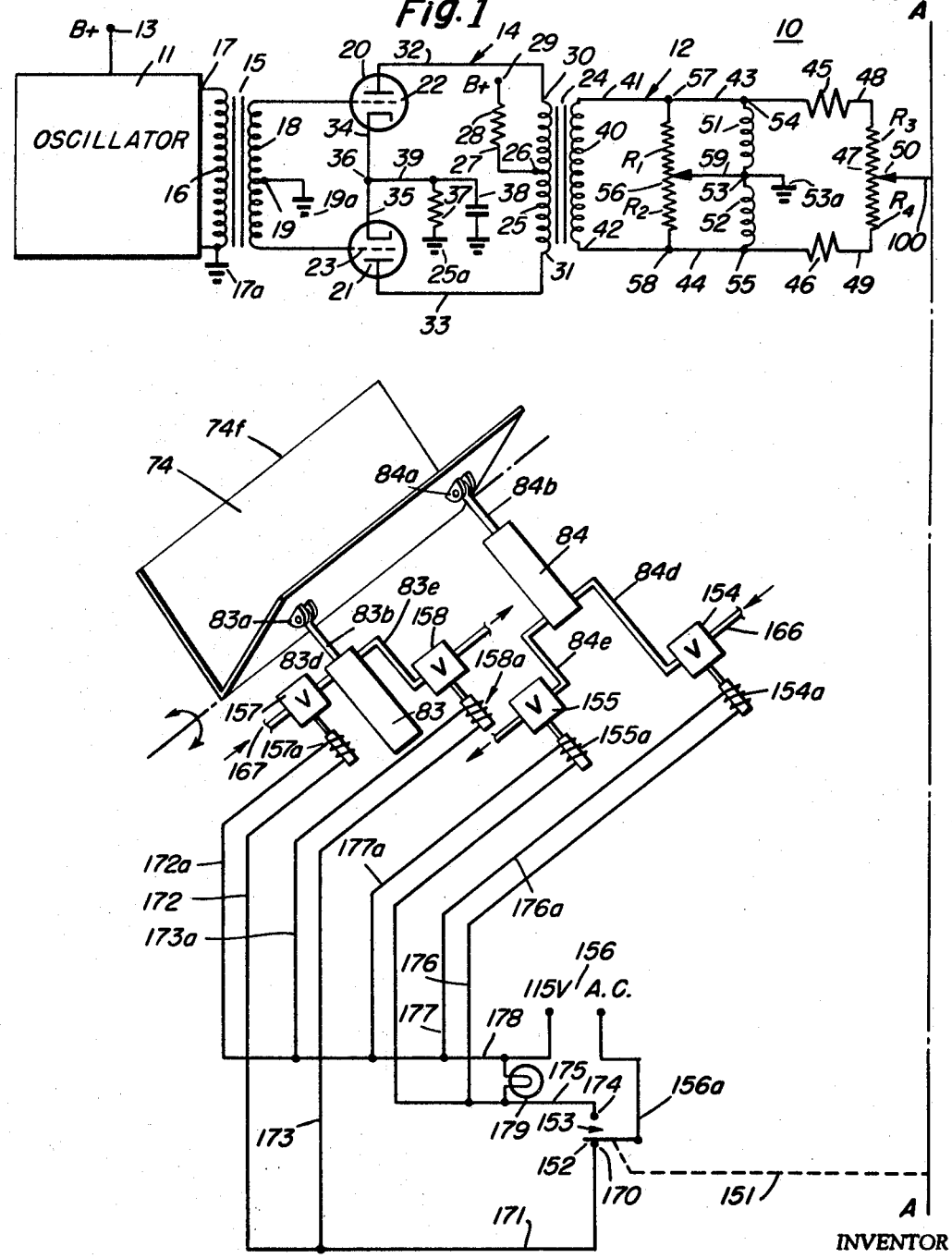
INVENTOR
George H. Smith
BY
ATTORNEY

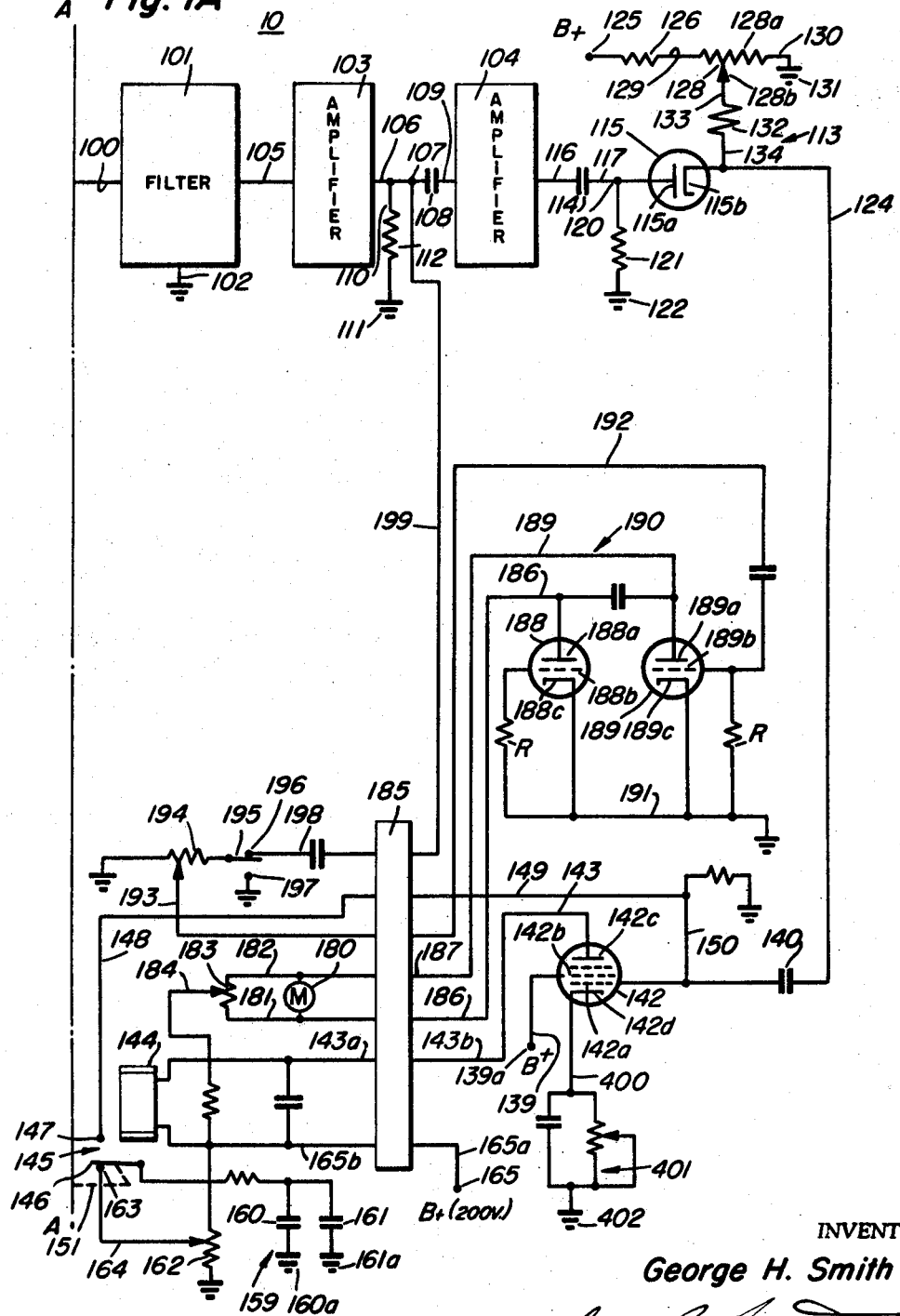

July 2, 1968    G. H. SMITH    3,390,767
SURFACE FORM INSPECTION APPARATUS AND METHOD
Filed June 17, 1965    5 Sheets-Sheet 3
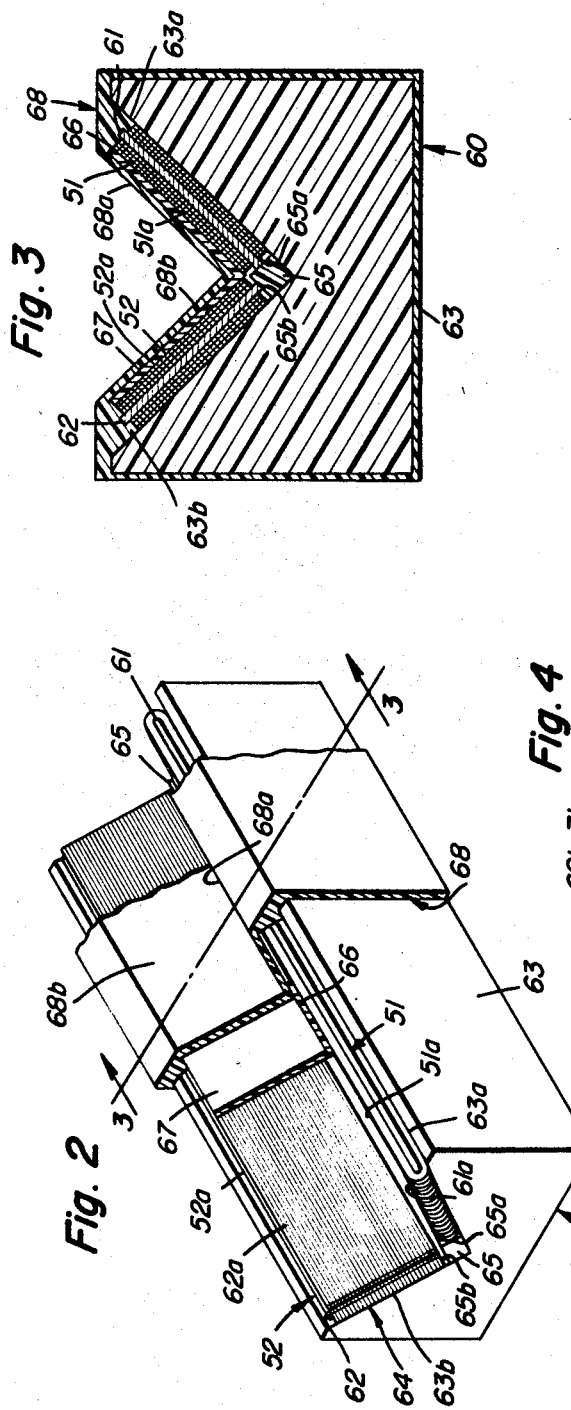
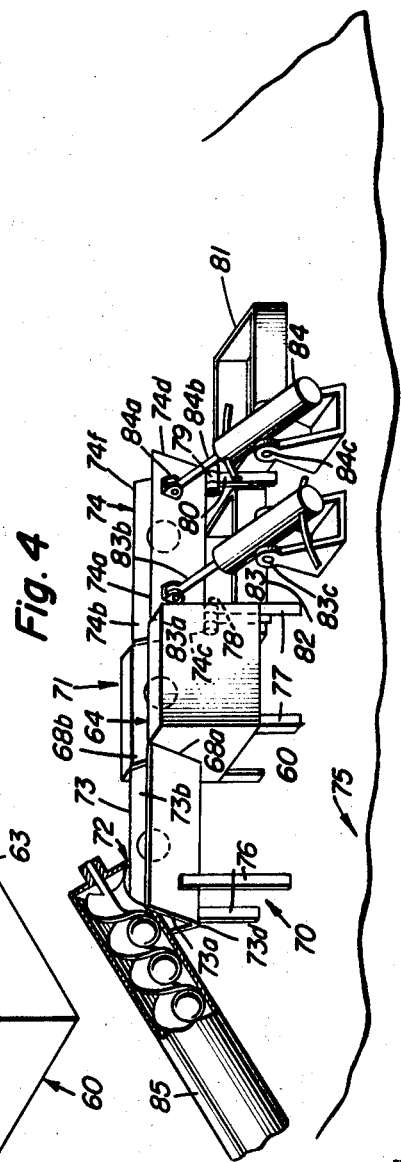
INVENTOR
George H. Smith
BY
ATTORNEY July 2, 1968  G. H. SMITH  3,390,767
SURFACE FORM INSPECTION APPARATUS AND METHOD
Filed June 17, 1965  5 Sheets-Sheet 4
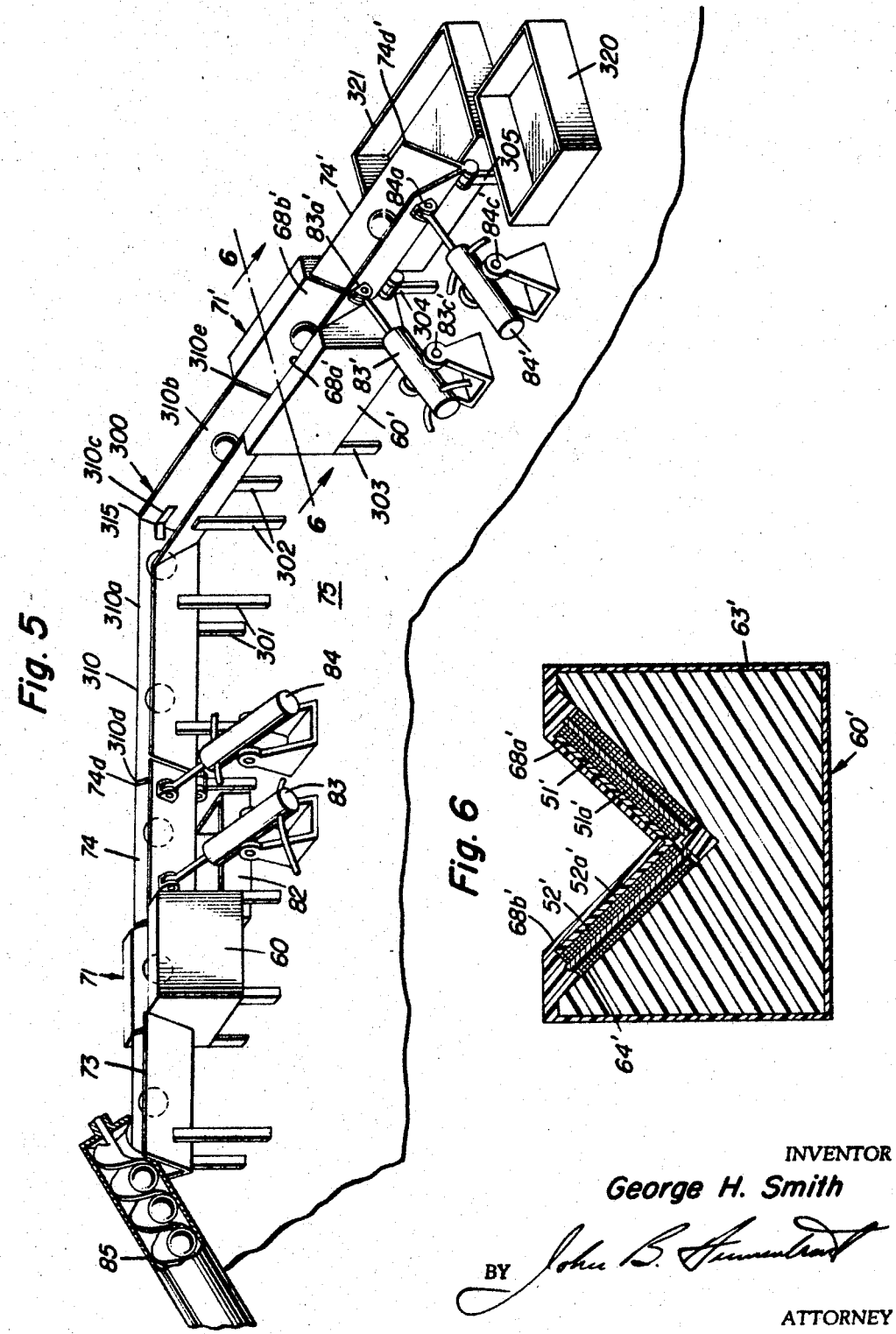
INVENTOR
George H. Smith
BY John B. [signature]
ATTORNEY July 2, 1968  G. H. SMITH  3,390,767
SURFACE FORM INSPECTION APPARATUS AND METHOD
Filed June 17, 1965  5 Sheets-Sheet 5

INVENTOR
George H. Smith
ATTORNEY

United States Patent Office 3,390,767
Patented July 2, 1968

3,390,767
SURFACE FORM INSPECTION APPARATUS
AND METHOD
George H. Smith, Columbus, Ohio, assignor, by mesne
assignments, to Coates Steel Products Company, Green-
ville, Ill., a corporation of Missouri
Filed June 17, 1965, Ser. No. 464,710
25 Claims. (Cl. 209—80)

ABSTRACT OF THE DISCLOSURE

An apparatus and method are provided for appraising magnetic balls according to trueness of surface form, the ball being rolled about one or more axes in interaction with magnetic fields to produce electrical signals varying in magnitude with respect to each other and representing difference in surface form of the ball. The magnetic ball is appraised through use of a function varying with the extent that the electrical signals vary with respect to each other during inspection of the magnetic ball.

---

The present invention relates to appraising the surface properties of products and more especially is concerned with the detection of irregularities and defects in form.

An object of the present invention is the provision of apparatus by which surface shape of a magnetic ball may be sensed for the ball to be graded as to trueness of form.

Another object of this invention is to provide apparatus of the character indicated in which a function of the degree of trueness of surface shape of a magnetic ball is inherently in comparable signals corresponding to a plurality of regions of a magnetic ball.

Another object herein is the provision of apparatus of the character indicated in which a magnetic ball accommodated is in effect self-referenced, inspection being simultaneously plural for different regions of the magnetic ball to be compared.

Still another object herein is to achieve inspection of any of a number of magnetic balls in sequence under conditions where a self-referencing effect of the magnetic ball tolerates such variables from ball to ball as size and degree of hardness while enabling a function of the degree of trueness of surface shape to be derived through comparison of a plurality of regions of the ball being inspected.

A further object of this invention is the provision of apparatus for grading a magnetic ball on the degree of relative variation of a plurality of signals each being varied as a function of relative trueness of surface form of a magnetic ball.

A further object herein is to selectively route a magnetic ball in a conveying system having facility of the character indicated and to grade a magnetic ball as to trueness of surface shape by controlling selection of route for each ball in accordance with the corresponding grade ascertained.

Another object is the provision of apparatus of the character indicated which inspects and routes each of a plurality of magnetic balls sequentially.

Another object is that of providing an apparatus which is adapted to support a magnetic ball for the magnetic ball to roll and further being adapted to inspect the magnetic ball while the rolling progresses for such defects as pits, flats, abrasions, pebbling, or the like, and more generally to appraise whether there is variation from true surface shape of the ball.

A further object of the present invention is the provision of apparatus which alters rolling movement of a magnetic ball for the magnetic ball to have rolled in different stages about axes differing with the stages and which apparatus electromagnetically senses surface grade of the magnetic ball with respect to regions of the ball while the ball is rolling in each of the stages.

A still further object herein is to provide an apparatus of the character indicated which includes a pair of sensing stations for surface grade of a magnetic ball to be electromagnetically sensed with respect to axes of rolling within the stations differing with the stations, and which apparatus by sensing surface grade of the magnetic ball in the first of the pair of stations can grade out the magnetic ball as being of inferior surface grade or forward the magnetic ball as being relatively superior in grade to the second of the pair of stations to roll axially differently than in the first of the pair of stations thus for surface grade of the magnetic ball to be further appraised.

Another object of the present invention is the provision of apparatus in which a magnetic ball being tested for trueness of surface shape makes rolling contact with laterally disposed members of a guide while regions of the magnetic ball over the laterally disposed members are electromagnetically compared.

Still another object herein is to provide a method whereby form of a magnetic ball is electromagnetically sensed and then is appraised as to trueness.

A further object is that of providing a method of the character indicated wherein different regions of a magnetic ball are simultaneously inspected as to trueness of surface form while the magnetic ball is rolling and trueness is appraised on a comparison of the regions.

A still further object herein is the provision of a method of the character indicated wherein regions of a magnetic ball are inspected and appraised on a comparison of the regions in each of a plurality of stages of rolling with the rolling in the stages being about axes differing with the stages.

Other objects of the invention in part will be obvious and in part pointed out more fully hereinafter.

In the accompanying drawing wherein illustrative embodiments of apparatus in accordance with the present invention are represented:

FIGURES 1 and 1a are a schematic view of a routing device having motors and valves for power operation and further provides a control circuit allied with an oscillator and having an impedance bridge and related controls for the valves to be controlled;

FIGURE 2 is a perspective view of support and induction coil means for supporting a magnetic ball and is partially broken away to expose induction coils which are components of the impedance bridge in FIGURE 1;

FIGURE 3 is a right cross section taken at line 3—3 in FIGURE 2;

FIGURE 4 is a schematic view of a system for conveying, inspecting and routing a magnetic ball and having the support and induction coil means of FIGURE 2 therein in an inspection station together with the power operated routing device of FIGURE 1;

FIGURE 5 represents an extension of the system of FIGURE 4 and providing an additional inspection station and power operated routing device;

FIGURE 6 is a right cross section taken at line 6—6 in FIGURE 5; and

Figure 7:
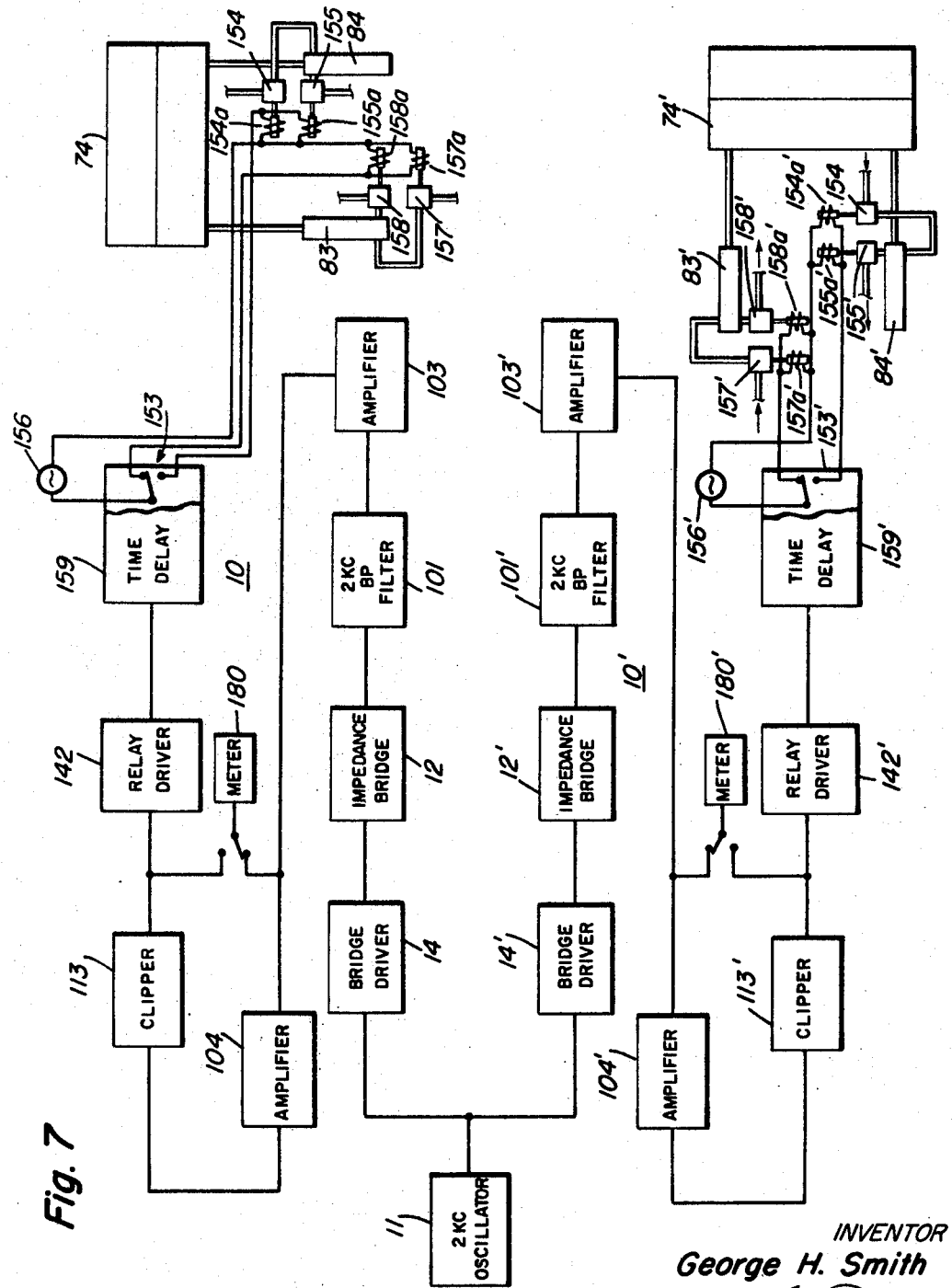
FIGURE 7 is a diagram of power operated and routing devices of FIGURE 5 each having a corresponding control circuit for valves thereof, with the control circuits allied for input with an oscillator.

As conducive to a clearer understanding of certain features of the present invention, magnetic balls such as of steel, or of other material having coercive properties in an electromagnetic system, are in demand for any one or more of a variety of purposes, and it becomes desirable to inspect the magnetic balls for surface defects and irregularities. To illustrate, inspections of this character are in demand for grading mill balls in the ball mill industries or widely elsewhere to appraise satisfactorily the accuracy of surface shape of a number of balls. On occasions, for example, inspection is called for to detect and scrap balls of inferior surface grade in favor of accepting those balls which pass scrutiny, the latter collectively, when residual in number, being of a higher average surface grade ready to meet requirements in actual practical use or being more immediately needful of further inspection more completely to assure acceptance of proper balls in grade. In some of many further possible instances, inspections are desirable for establishing different groups of balls so that the groups, though differing in surface grade, are adequate for meeting closely related needs or for serving some other, though perhaps remotely different, useful purposes.

A further object herein accordingly is the provision of a method and apparatus by which magnetic balls may be inspected for degree of trueness of surface shape well within adequacies of inspection required to satisfy expeditious commercial achievement of a graded product.

Referring now more particularly to certain practices in accordance with the present invention, a magnetic ball is inspected as to degree of trueness of surface shape by operations which include maintaining first and second electrical signal outputs correspondingly from first and second induction coil means while the first and second induction coil means are electrically energized to have first and second fields of magnetic flux correspondingly for the first and second electrical signal outputs each to vary as a function of trueness of surface form of a magnetic ball when the magnetic ball is suitably supported and is accordingly rolled within the first and second fields of magnetic flux simultaneously. Thus, by proper support for the rolling to occur, and from the fact that the energizing currents in the first and second induction coil means are appropriately self-inductively linked respectively with the rolling magnetic ball through the first and second fields of magnetic flux, a function of the degree of trueness of surface shape of a magnetic ball is importantly available varying as the relative variation of the inductances of the first and second induction coil means and as the relative variation of the first and second signal outputs of these coil means. Preferably, the first and second electrical signal outputs as sustained will have a substantially zero differential in magnitude when the magnetic ball being rolled within the first and second fields of magnetic flux is a truly spherical ball, and will relatively vary in magnitude such as from a substantially zero differential as a function of degree of trueness of surface shape of a magnetic ball when the magnetic ball rolling suitably supported in the first and second fields of magnetic flux has other than truly spherical form exposed to the first and second magnetic fields. Also, preferably, the first and second electrical signal outputs are electrically opposed to each other, as for example by having the first and second induction coil means correspondingly in first and second impedance branches of an impedance bridge interconnected electrically for the bridge to have for output a third electrical signal which varies as a function of the difference in magnitude of the first and second electrical signal outputs of the respective induction coil means and thus as a function of degree of trueness of surface shape of the magnetic ball rolling within the first and second fields of magnetic flux.

The inspection of a magnetic ball as to degree of trueness of surface form in the manner indicated is achieved under conditions where rolling regions of the magnetic ball are simultaneously introduced correspondingly into the first and second fields of magnetic flux, and the energizing currents in the first and second electrical induction coil means accordingly are self-inductively linked with the respective regions through the first and second fields of magnetic flux and relatively vary in self-inductance as a function of magnitude of the difference in degree of trueness of surface shape of the regions with reference to each other, the first and second electrical signal outputs therefore offer reference to each other interchangeably as a reference signal and vary in magnitude as a function of degree of trueness of surface shape of a magnetic ball.

A rolling of the magnetic ball within the fields of magnetic flux of both the first and second induction coils is best continued for at least about one complete revolution of the magnetic ball in at least a first stage of rolling and then if desired a further stage or stages of rolling are added for supplementally inspecting the surface shape of a magnetic ball. The rolling of the ball in each stage is about an axis differing from the axis of rolling in the other stage or stages. An appraisal of degree of trueness of surface shape of the magnetic ball is made from each stage of rolling and is based upon magnitude of relative variation of first and second electrical signal outputs produced by the rolling magnetic ball in the manner hereinbefore described. The appraisal made from a stage of rolling of the character indicated is accomplished with the aid of one or more of audible, visible, or other signal magnitude responsive means, responding to, or enabling comparison of, the first and second electrical signal outputs in terms of surface grade. The different stages of rolling are sequentially brought about, such as in the same inspection station, while relying upon the same first and second induction coil means and first and second electrical signal outputs corresponding to the coil means in the station and appraising degree of trueness of surface shape of the magnetic ball in each of the stages, or, as an alternative, a plurality of inspection stations, each correspondingly equipped with first and second induction coil means of the character indicated, are utilized with first and second electrical signal outputs from the coil means of the station, and degree of trueness of surface shape of the magnetic ball is appraised for each stage through being a function of the relative variation which the magnetic ball promotes upon the signal outputs of the corresponding station. Where employing the same inspection station and the same first and second induction coil means for inspecting the magnetic ball in each of a plurality of stages of rolling, the magnetic ball illustratively is re-cycled through the station or otherwise is caused to roll sequentially through a plurality of stages of rolling within the station about axes of the ball differing with the stages and the surface characteristics of the ball are appraised in each of the stages.

A plural inspection station technique as described is advantageously involved with transferring and grading operations wherein a plurality of magnetic balls are inspected in sequence in the first station and are sorted in accordance with rating on surface grade derived from inspection in the first station, the sorting including transfer either to the second station or to avoid the second station. In the latter instance, the magnetic balls sorted out are already assuredly of a surface grade or grades which justifies having been sorted from the other magnetic balls to avoid the second station. The magnetic balls from the first station residually advanced to the second station are sequentially inspected, each while rolling about an axis changed to be different from a prior axis about which the same magnetic ball rolled during inspection in the first station, and on being appraised as to surface grade, sorting ensues according to surface grade on the basis of the latter appraisal.

The sorting following inspection of the magnetic balls at the first station, and then again following inspection of the magnetic balls in residual number in the second station, preferably is made to be an incident to conveying and routing the magnetic balls in a system including the stations and to occur through use of the relative variations of the first and second electrical signal outputs corresponding to the station to control routing from the station in accordance with the appraisal of surface grade of the magnetic ball in the station. More generally, and still in accordance with the practice of the present invention, the second inspection station may be omitted from the system in favor of inspecting a series of magnetic balls passing through a single station in the system and then routing the magnetic balls and sorting the magnetic balls according to magnitude of the degree of relative variation of the first and second electrical signal outputs of the single station caused by each ball.

Referring now more particularly to the illustrative embodiment of the present invention represented in FIGURES 1 to 4 of the accompanying drawing an apparatus is provided for inspecting and routing a magnetic ball as to surface grade and includes a control circuit generally designated 10 associated with a 2 kc. resistance-capacitance tuned oscillator 11 (see FIGURE 1) connected on input with B+ terminal 13 of a source of approximately 200 volt direct current supply, the control circuit 10 having an impedance bridge circuit 12 therein for the bridge to receive an energizing alternating current output from the oscillator. From time to time in the ensuing description, B+ terminals in addition to the aforementioned terminal 13 will be disclosed in the control circuit 10 and it will be understood that all of these terminals are conveniently adapted to have connection with the same source of direct current supply as the oscillator and be at a potential of about 200 volts. As more particularly shown, the oscillator is connected in push-pull with the bridge circuit 12 by means of a bridge driver circuit 14, there being a first transformer 15 having a primary winding 16 connected with output lead 17 from the oscillator and to ground 17a for conducting the oscillating current of the oscillator and thus inducing a voltage in secondary winding 18 of the transformer. A center tap 19 of the secondary winding 18 is grounded at 19a and opposite ends of this same winding are electrically connected to bias the grids 22 and 23 of triodes 20 and 21 in the bridge driver circuit 14. A second transformer 24 has its primary winding 25 connected at a center tap 26 through lead 27 and resistor 28 with B+ voltage terminal 29 and opposite ends 30 and 31 of the primary winding 25 are respectively connected across the cathodes and anodes of triodes 20 and 21 to ground at 25a by leads 32 and 33 respectively and by leads 34 and 35 to junction 36 and thence by lead 39 and reistance and capacitance branches 37 and 38. As employed, the oscillator 11 maintains biases which are of opposite polarity on the corresponding grids 22 and 23 and thus the triodes 20 and 21 alternately conduct on the frequency of the oscillator an amplified signal from the B+ source 14 connected with center tap 26 of primary winding 25, the electrical current being from this center tap through lead 32 and triode 20 and thence to the resistance and capacitance branches 37 and 38, and alternately from center tap 26 through primary winding 25, lead 33, triode 21, and to the resistance and capacitance branches 37 and 38 of the bridge driver circuit. This alternating current in the primary winding 25 causes a signal having the frequency of oscillator 11 to be induced in the secondary winding 40 of transformer 24, the latter winding being in the impedance bridge circuit 12 and having end terminals 41 and 42 respectively connected with first and second leads 43 and 44 which are joined to the one ends of resistances 45 and 46, the latter preferably being of like ohmic rating. The other ends of resistances 45 and 46 are on the electrical output side of the bridge circuit 12 and are electrically interconnected through a variable resistance 47 and leads 48 and 49, the variable resistance having an adjustment arm 50 through which the bridge circuit 12 may conduct on output. Among other impedance components of the bridge circuit are a pair of series electrically connected first and second induction coils, respectively designated by the reference numerals 51 and 52 and having their adjacent one ends interconnected from common junction 53 to ground at 53a and their opposite ends connected at junctions 54 and 55 respectively with leads 43 and 44 for the first and second induction coils to be electrically opposed from these leads to ground. A variable resistance 56 is connected in shunt with leads 43 and 44, having junctions 57 and 58 electrically between terminals 41 and 42 of the secondary winding 40 and junctions 54 and 55, the latter being those at interconnection of the first and second induction coils 51 and 52 with these same leads. An adjustment arm 59 of the variable resistance 56 extends to junction 53 and thence is grounded at 53a.

For a magnetic ball to be supported to roll and be inspected in the present embodiment, the first and second induction coils 51 and 52 are components of induction coil and support means 60 (see FIGURES 2 and 3) and preferably are similar bodily and in electromagnetic properties. In this respect, the first and second induction coils correspondingly include magnetic core plates 61 and 62 respectively having plane faces 61a and 62a. Induction coil 51 is wound about magnetic core plate 61 for each of the convolutions of the coil to have a pass 51a coextending parallel with like passes of the other convolutions of the coil and over the core plate face 61a parallel to the latter face. Likewise, induction coil 52 has its convolutions wound about magnetic core plate 62 for a pass 52a in each convolution of this coil to be parallel to like passes in the other convolutions thereof and extend over the core plate face 62a parallel to the latter face. The first and second induction coils and their cores are supported by means of a support block 63 of suitable insulating material such as hard rubber or phenolic resin. Block 63 is provided with a V-shaped notch 64 longitudinally thereof and the notch is defined by upwardly and outwardly inclined faces 63a and 63b of the block. A support member 65, integral with or suitably attached to the block 63, is disposed along the bottom of the notch and provides shoulders 65a and 65b for maintaining the adjacent edges of the core plates of the coils in proper position and insulated from each other in the notch while the convolutions of the coils rest against the upwardly and outwardly inclined faces 63a and 63b of the block. In the relative positions thus attained the first and second induction coils are directly opposite one another physically in the notch and have the passes 51a and 52a of their convolutions coextending parallel to each other along the length of the notch 64 at like elevations in the notch with the faces 61a and 62a of core plates 61 and 62 upwardly and outwardly inclined with respect to each other. In these relative positions the first and second induction coils and their magnetic cores are fixed to the block, as hereinafter described, to exercise like electromagnetic properties when equally electrically energized and so that when a magnetic ball rolled along course in the notch longitudinally of the notch is a truly spherical ball this ball will follow substantially the longitudinal direction of passes 51a and 52a of the convolutions of the first and second induction coils. The lengths of the latter passes in the notch are preferably sufficient to enable a magnetic ball being inspected to effect at least one rolling revolution directly along the passes. As shown, protective sheets 66 and 67 of nylon or of other suitable material are disposed over the passes 51a and 52a of the coils in the notch and the entire assembly has been potted to have a covering 68 of epoxy or of other suitable material so that plane faces 68a and 68b of the potting material cover the sheets 66 and 67 and are over and parallel to the corresponding coil passes 51a and 52a. The sheets and potting material referred to are advantageous for stabilizing the convolutions of the coils in the aforementioned relative positions in the coil and support means 60 and assure protection of the passes from damage or wear brought about when magnetic balls are rolled along faces 68a and 68b in the passes of the coils in the notch 64. In such instances as where the coil wires themselves carry an adequately wear resistance insulation, further shielding facially in the notch is sometimes omitted thus exposing the convolutions facially in the notch.

The first and second induction coils 51 and 52 when electrically energized in the impedance bridge circuit 12 correspondingly have first and second electrical signal outputs and have first and second flux paths or fields of magnetic flux respectively extending through the magnetic core plates 61 and 62, and each path or field links the related core plate in a magnetic flux circuit which extends over the passes of the related coil in the notch 64 of block 63 and transversely of the course or direction which a magnetic ball to be inspected can travel longitudinally of the block while rolling in the notch. When a magnetic ball rolling in the notch is substantially a truly spherical ball, opposite regions of the ball continuously make substantially one point rolling contact respectively with faces 68a and 68b of the induction coil and support means 60 and thus these regions of the magnetic ball are supported to roll simultaneously within the individually corresponding fields of magnetic flux of the first and second induction coils 51 and 52. In a rolling of the latter sort, the inductances of the first and second coils encounter minimum relative variation under the influence of the magnetic ball. With it asumed now that the bridge circuit 12 has been adjusted, as it is capable of being, to a sufficiently balanced condition by appropriately setting the adjustment arms 50 and 59 of the variable resistances 47 and 56, the output voltage of the bridge circuit 12 and more particularly that at arm 50 will vary as a function of the magnitude of the relative variation of the inductances of coils 51 and 52 and as a function of the degree of trueness of surface shape of the magnetic ball rolling within the magnetic fields of the coils. Substantially truly spherical regions of a magnetic ball turning in these fields produce a minimum output voltage of the bridge circuit while lack of uniformity of shape of these regions, comparatively, produces a signal increasing with the degree of variance from uniformity.

The bridge circuit adjustments aforementioned provide legs $R_1$ and $R_2$ of resistance 56 having their mutual point of contact grounded through arm 59, and legs R3 and R4 of resistance 47 which have mutual point of output contact with arm 50. As adjusted, the bridge circuit on each half cycle of the energizing current in secondary winding 40 conducts from the winding terminal 41 through lead 43 and resistance leg $R_1$ to ground through arm 59 from lead 43 through coil 51 and junction 53 to ground, from the secondary winding terminal 42 through lead 44, resistance leg $R_2$ and thence via arm 59 to ground and from lead 44 through coil 52 and junction 53 to ground. The inductances in coils 51 and 52 are reflected differentially as an output voltage or signal in arm 50, through the impedance legs including resistances 45 and 46 and components $R_3$ and $R_4$ of the resistance 47 on each half-cycle of the alternating current of the bridge circuit. When the magnetic ball rolling, preferably at least about one complete revolution as before, in the magnetic fields of the coils 51 and 52, has a surface defect appurtenant to a supported region thereof causing the magnetic ball to be appreciably other than truly spherical, the defect in the rolling region within the magnetic field of the related coil 51 or 52 alters the inductance of this coil while the inductance of the other of the coils serves as a reference, and the inductances of the coils thus relatively vary and the magnitude of the relative variation of the inductances of the coils is accompanied by a commensurate change in the output voltage signal of the bridge. The output voltage promoted by the ball surface defect is a voltage increased beyond that which would be indicative of the relative lack of surface defect.

Further, in accordance with the present embodiment, support and induction coil means 60 is located at an inspection station 71 (see FIGURE 4) and is a component of a conveying, inspection and routing system 70 for magnetic balls to be conveyed, inspected as to degree of trueness of surface shape and be routed in accordance with degree of trueness noted in the inspection. The system further has ball input means 72 including a chute extension 73 rearwardly from the support and induction coil means 60 and has a power operated routing or chute device 74 forward of the support and induction coil means. The support and induction coil means and the rearward chute extension are suitably fixed in position as to a base 75 by struts 76 and 77. Upwardly and outwardly diverging inside plane faces of opposite side walls 73a and 73b of the rearward chute extension are aligned respectively with faces 68a and 68b of the support and induction coil means 60 so that the latter faces can receive and support a magnetic ball rolling from the chute extension into the notch 64.

The power operated chute device 74 is a laterally movable device having spaced pivotal connections 78 and 79 at the bottom thereof as to base 75 by means of struts 80 for the device to pivot laterally between an upright position indicated in FIGURE 4 and a reject position to be described. In the upright position chute device 74 has inside plane faces of opposite side walls 74a and 74b thereof upwardly and outwardly diverging and aligned respectively with the upwardly and outwardly diverging faces 68a and 68b which extend over the induction coils of the support and induction coil means 60. In this same position the rearward end 74c of the chute device continues directly from the forward end 60a of induction coil and support means 60 so that a magnetic ball will roll from notch 64 and enter the chute device rollingly, thus for the ball to advance and be discharged from the forward end 60a of the chute device into a collection bin 81. When the chute device 74 is pivoted to reject position, side wall 74b of the device in this position has the outer edge 74f lower than the pivots 78 and 79 and the inside face of this wall is downwardly inclined toward outer edge 74f for the chute device laterally to discharge a magnetic ball into a corresponding collection bin 82. The upright and reject positions of the chute device 74 are achieved by that device having power drive means, suitably return motor 83 and reject motor 84 as components, and through control of the power drive means in a manner such as will be hereinafter described. The motors 83 and 84 presently used are of pneumatic type having cylinder walls mounted on trunnions 83c and 84c as to base 75 for pivoting, and the piston rods 83b and 84b of the motors are pivotally connected at 83a and 84a to wall 74a of the chute device for the motors to drive the chute device between the upright and reject positions.

The conveying, inspection and routing system 70 is adapted to receive magnetic balls intermittently on the rearward chute extension 73, either by manual deposit or from the charging conveyor means 85 for the magnetic balls thence to roll one at a time in the inspection station 71 and more particularly in notch 64 and thus be inspected singly and then further roll onto the power operated chute device 74 and be routed singly. The charging conveyor 85 is a suitably mounted and powered lift conveyor of the screw type for depositing magnetic balls intermittently in the chute extension 73 from a source of supply such as a hopper (not shown). A gradient exists from the ball input end 73d of the rearward chute extension 73 to the longitudinal output end 74d of the power operated chute device 74 for each magnetic ball deposited on the chute extension to advance rolling by gravity through the system until the magnetic ball is routed by the power operated chute device. The advance of the magnetic balls in the system is importantly characterized by the fact that but one magnetic ball at a time rolls through the inspection station 71 and more particularly in the magnetic fields of coils 51 and 52, so that false signals will not be obtained, and thence onto the power operated chute device 74 for being routed singly in accordance with true signal obtained from the inspection. The intervals at which the magnetic balls are deposited onto rearward chute extension 73 by the charging conveyor 85 and the gradient thence for gravity feed, uphold advance of the character indicated. When desired, the force of gravity for inspecting the balls may of course be supplemented or replaced by other suitable impulsion for one magnetic ball at a time to be inspected and routed.

Output arm 50 of the impedance bridge circuit 12 has a connecting input lead 100 to an electronic filter 101, such as a 2 kc. bandpass filter suitably grounded at 102, and which minimizes harmonics in the bridge circuit output signal. The filter thence is connected in series with first and second amplifiers 103 and 104 in the control circuit 10 through leads 105, 106, meter lead junction 107, capacitor 108 and lead 109, for the bridge circuit output signal to be amplified. A lead 110 connects lead 106 to ground at 111 through resistance 112. Amplifier 104 has output to signal clipper means 113, including the diode 115 and controls therefor as will be described in the ensuing description.

More particularly amplifier 104 has an output lead 116 to condenser 114 and lead 117 connecting the condenser to anode 115a of the diode for the amplified signal received from the bridge circuit output 50 to be put into the diode. Lead 117 has junction 120 with a resistance element 121, the latter thence being grounded at 122. Cathode 115b of the diode is connected to an output lead 124 and moreover is associated with a biasing circuit wherein B+ voltage terminal 125 is connected in series with a resistance element 126 and the variable resistance 128 by lead 129 and thence to ground at 131 by lead 130. Resistance component 128a is in contact with arm 128b of the variable resistance, the latter arm itself being connected in series with a resistance 132 and the diode cathode 115b by means of leads 133, 134 and 124. The bias voltage applied to cathode 115b of the diode by adjustment of arm 128b delineates between voltage ranges corresponding respectively to two different grades into either of which a magnetic ball rolling in the magnetic fields of induction coils 51 and 52 of the bridge circuit 12 may belong on the results of the inspection. When the voltage signal imposed by the amplifiers 103 and 104 upon the anode 115a of the diode is below the voltage biasing the cathode 115b then the diode does not conduct and accordingly grades the magnetic ball under inspection at station 64 (see FIGURE 4) as being of relatively high quality with respect to trueness of surface shape. When the voltage of the signal imposed upon anode 115a is of a magnitude which exceeds the bias on cathode 115b, however, the diode conducts and thus grades the magnetic ball under inspection as having a surface shape which as a relative matter lacks trueness.

Lead 124 from the cathode of the diode 115 has input connection with a condenser 140 and on output this condenser is connected with the grid 142a of a relay driver 142 in which a further grid component 142b is maintained at B+ voltage through lead 139. The relay driver electrodes 142c and 142d are in circuit with relay coil 144 and the circuit may be traced from B+ voltage terminal 165, leads 165a and 165b, through the relay coil 144, thence along leads 143a and 143b, across the relay driver electrodes 142c and 142d, lead 400 and into capacitance-resistance network 401 and to ground 402.

As the voltage of the signal transmitted from diode 115 via lead 124 exerts bias upon the related relay driver grid 142a, the relay driver conducts and relay coil 144 accordingly is energized. Energization of coil 144 actuates a switch 145 to move switch arm 146 of the switch to a closed position with respect to a normally open contact 147 of a lead 148 which can be traced to leads 149 and 150 back to the grid 142a of relay driver 142, for a purpose set forth hereinafter. Also, a mechanical interconnection 151 between switch arm 146 and a switch arm 152 of a second switch 153 causes simultaneous movement of switch arms 146 and 152 in response to energization of relay coil 144 and causes switch arm 152 to engage a normally open contact 174 to close a circuit including solenoid actuated valves 154 and 155 associated with the reject pneumatic motor 84. The solenoids 154a and 155a of valves 154 and 155 are adapted to be energized by means of an alternating current power source 156, and closing of switch arm 152 on contact 174 connects power source 156 in circuit with the solenoids. The operation of solenoid valves 154 and 155 and reject motor 84, together with the operation of a second set of solenoid valves 157 and 158 and the return pneumatic motor 83 will be set forth more fully hereinafter.

It will be appreciated that the signal from diode 115 which actuates relay 144 to close switch arm 146 on contact 147 may well be of only momentary duration, whereby solenoid valves 154 and 155 controlling the reject motor 84 would not be energized for a time sufficient to assure removal of the ball from the chute device 74. Yet, it is important that the power operated chute device 74 be maintained in its reject position for a time sufficient to assure discharge of the ball from this device. Accordingly, a holding circuit 159 is provided for assuring energization of solenoid valves 154 and 155 for a sufficient length of time. Holding circuit 159 includes the leads 148, 149 and 150, mentioned above, and it will be recalled that switch arm 146 closes on contact 147 of lead 148 in response to the signal transmitted from relay driver 142. The holding circuit further includes a pair of capacitors 160 and 161 having terminals grounded at 160a and 161a and capacitors which are energized through potentiometer 162 during the time when switch arm 146 is in its normally closed position on contact 163 of lead 164 associated with potentiometer 162. The build up of voltage in capacitors 160 and 161 is provided by means of the B+ source of bias 165 electrically connected to capacitors 160 and 161 through leads 165a and 165b, potentiometer 162, lead 164 and switch arm 146. The variable resistance 162 provides for selectivity in controlling the magnitude of the voltage stored by capacitors 160 and 161. When the signal from relay driver 142 energizes relay 144 to move switch arm 146 into engagement with contact 147, a circuit is completed between capacitors 160 and 161 and relay driver 142 through switch 145 and leads 148, 149, and 150 whereby relay driver 142 is biased to conduct from a longer period of time than provided by the signal received from bridge circuit 12.

Pneumatic motors 83 and 84 have power chambers connected for input through flexible lines 83d and 84d with input valves 154 and 157 to a source of pneumatic fluid under pressure (not shown) supplying inlet lines 166 and 167, the pressure of the fluid being sufficient to maintain operation of the several motors as desired. Flexible exhaust lines 83e and 84e lead from the power chambers of motors 83 and 84 to exhaust valves 158 and 155 respectively, for the release of the pneumatic fluid pressure from within these chambers. Solenoid valves 154, 155, 157 and 158 are adapted to be energized in a manner whereby chute device 74 is first positively pivoted from the normal upright position to the reject position and then is positively returned to the upright position. In this the chute device moves on its pivots 78 and 79 as the motors pivotally adjust at pivots 83a and 84a and at trunnions 83c and 84c. More particularly, when relay 144 is de-energized, switch arm 152 is in its normally closed position against contact 170 of a conductor 171 and establishes connection through switch arm 152 and lead 156a with alternating current source 156. Leads 172 and 172a and leads 173 and 173a of solenoids 157a and 158a of valves 157 and 158 associated with return motor 83 are connected across conductor 171 and a conductor 178 to power source 156. Motor 83, as mentioned above, is employed not only to return chute device 74 to its upright or guide position following a reject operation but to maintain the chute device in the upright position until a subsequent reject operation. Intake valve 157 of motor 83 is maintained open and exhaust valve 158 closed when relay coil 144 is de-energized to provide the chute device 74 in the upright position. When switch arm 152 engages contact 174, the circuit to solenoids 157a and 158a of valves 157 and 158 of motor 83 is opened, whereby the intake of pneumatic fluid to the latter is discontinued by operation of intake valve 157 to closed position and exhaust valve 158 is opened to release the chute member for pivotal movement. Switch contact 174 is associated with a conductor 175, and leads 176 and 176a and leads 177 and 177a of solenoids 154a and 155a, respectively, are connected across conductor 175 and conductor 178 to power source 156. Thus, when the circuit to solenoids 157a and 158a is open, solenoid 154a of pneumatic fluid intake valve 154 of reject motor 84 is energized to open the related intake valve and solenoid 155a of exhaust valve 155 of motor 84 is energized to close the related exhaust valve. Accordingly, pneumatic fluid under pressure flows into motor 84 to actuate the latter to move chute device 74 to the reject position. Upon termination of the signal which energizes relay 144, switch arms 146 and 152 under control of holding circuit 159 return to their normally closed positions engaging contacts 163 and 170, respectively. Closing of switch arm 152 on contact 170 de-energizes solenoids 154a and 155a of intake and exhaust valves 154 and 155 of motor 84 to permit return of the chute device 74 to its upright position by means of return motor 83, the solenoid valves corresponding to which are energized by return of the switch arm 152 to its normally closed position.

The minimum interval between each magnetic ball and the ensuing magnetic ball put into the system via chute extension 73 is great enough for the power operated chute device 74 to reject a magnetic ball corresponding to the inspection station signal and thus operate from the upright position to the reject position and back to the upright position before another magnetic ball can enter the chute device from the inspection station. This is coupled with having the rolling rate of each magnetic ball leaving the inspection station 71 to be adequate for the magnetic ball to reach and be on the power operated chute device 74 by when the reject motor 84 overcomes lag in responding to a reject signal corresponding to the ball and thus initiates rejection because the signal is commensurate with this action.

An indicator such as lamp 179 is connected across conductors 175 and 178 to give visual indication of surface grade of a magnetic ball. By remaining de-energized, the lamp indicates one grade and by being energized indicates a different grade. The lamp may, for example, be disposed adjacent to the induction coil and support means 60 and thus sometimes is relied upon as a guide for manually sorting the magnetic balls according to grades indicated by the inspection such as at a time when the motors 83 and 84 or the associated pneumatic fluid supply may have become disabled.

In order to balance impedance bridge 127 so that there is substantially no voltage output from the bridge prior to the introduction of a ball onto the support and induction coil means 60, a balancing circuit including a meter 180 is advantageously provided in the control circuitry. Meter 180 is connected across conductors 181 and 182 and in parallel with a variable resistance 183 having an adjustable arm 184 connected to bias source lead 165b which, as mentioned hereinbefore, is connected to the B+ bias terminal 165. Conductors 181 and 182, respectively, are connected through a power junction board 185 or the like with leads 186 and 187 connected respectively to anodes 188a and 189a of a pair of triodes 188 and 189 in a meter driver circuit 190. Variable resistance 183 permits adjustment of the bias current flowing through each of the conductors 181 and 182, and accordingly provides for balancing the bias current supplied to anodes 188a and 189a to achieve a condition under which the meter will rear zero. The grids 188b and 189b of triodes 188 and 189 are connected to a ground lead 191 through resistances R, and cathodes 188c and 189c of the two triodes are also connected to ground lead 191. Grid 189b of triode 189 is connected by leads 192 and 193 to a meter gain control having variable resistance 194 in series with the arm of switch 195, the arm being movable between a pair of contacts 196 and 197 and contact 197 being connected to ground. Contact 196 is connected to a lead 198 which can be traced through board 185 to lead 199 and thence to meter junction 107 between amplifiers 103 and 104. When meter gain switch arm 195 is closed on contact 196, a no-load signal from bridge circuit 12 is fed through lead 199 to lead 198, thence through coil 194 to leads 193 and 192 to grid 189b of triode 189. Triode 189 is thus biased by the bridge signal to conduct, which conduction unbalances the current flowing in conductors 181 and 182 across which meter 180 is connected. Under these circumstances the meter will deflect from its zero reading to indicate an unbalanced condition in bridge 10, namely an unbalanced condition between the impedances of coils 51 and 52 of the induction coil and support means 60. Adjustable resistors 47 and 48 of the bridge circuit are then manipulated until the meter indicates that only a negligible signal or no signal at all is being transmitted from the bridge circuit while the latter is under no-load conditions.

After the impedance bridge has been balanced as described above, induction coil and support means 60 of the inspection assembly is ready for operation in the system. When a spherical ball rolls along the coils 51 and 52, the inductance of each of the two coils adjusts accordingly and opposite regional portions or sides of the ball are inspected and these sides or regions are compared to one another from the inductances of the two coils. Since the coils are connected to have their signals taken as a function of residual difference from the impedance bridge circuit, the bridge circuit output voltage is a function of the difference between the impedances of the two coils. The output of the bridge is a voltage signal which is then filtered, amplified, and fed to the clipper diode 115. If the voltage signal transmitted to the diode is of a magnitude sufficient to overcome the bias applied thereto, then the diode will conduct the signal to advance over lead 124 to relay driver 142 and thence to relay coil 144 to actuate switches 145 and 153 to cause energization of solenoids 154a and 155a which in turn cause actuation of chute device 74 adjacent the induction coil and support means 60. The magnetic ball corresponding to the signal is, in view of rate of rolling and lag in response to the signal by the reject motor 84, by this time rolling on the chute device 74 and is deflected laterally with the chute device by operation of reject motor, the magnetic ball accordingly being deposited by gravity into collection bin 82 corresponding to this grade of ball. If the signal is not of a magnitude sufficient to overcome the bias of diode 115 when the ball being tested is within the acceptable category the chute device 74 remains upright and therefore the ball corresponding to the signal passes across the chute device and thence is received in bin 81 of this grade of ball.

An illustrative embodiment of an inspection system in accordance with the present invention and more particularly of a type characterized by having two inspection stations for sequentialy inspecting magnetic balls which are caused to roll about axes in the stations differing with the stations will be understood from the representation thereof in FIGURES 5 to 7 first as being one which includes the apparatus of FIGURES 1 to 4, through omitting the storage bin 81, and further a supplemental extension 300 is provided, the extension being on suitable mountings 301, 302, 303, 304 and 305 as to base 75. In the extension is a chute component 310 aligned with the power operated routing or chute device 74 and annexed to the output end 74d thereof to receive the magnetic balls from this device when the device, as controlled by motors 83 and 84 and valves 154, 155, 157 and 158 as aforementioned, remains in the upright position for routing a magnetic ball rolled in the flux paths of induction coils 51 and 52 of station 71, the latter now being termed the first inspection station. Extension 300 also includes a second inspection station 71' to which at least some of the magnetic balls can be transferred depending upon surface grade derived from inspection in the first station in the manner indicated hereinbefore with reference to FIGURES 1 to 4, and leading from the second inspection station is a second power operated routing or chute device 74'. Illustratively, the power operated routing or chute devices 74 and 74' are substantially the same in kind with both comparatively having for their respective functions similar pneumatic motors and similar solenoid actuated valves and having like control circuits 10 and 10' for the solenoid valves of each of the chute devices 74 and 74' to be controlled, all as schematically represented in FIGURE 7. The control circuit 10' having input from oscillator 11 may be the same as that which has already been described with reference to FIGURES 1 and 4, and also may have the same mode of operation as hereinbefore described except that when the power operated routing or chute device 74 remains upright for conveying a magnetic ball of relatively superior grade the magnetic ball will roll from the first inspection station 71 and thence follow the chute device 74 onto the chute component 310. Control circuit 10' is associated with the second inspection station 71' and otherwise conveniently is substantially a replica of control circuit 10 with both driver circuits 14 and 14' having their inputs supplied from the same oscillator 11.

Thus, second inspection station 71' accommodates a corresponding second induction coil and support means 60' which may be similar in all respects to the induction coil and support means 60 in the first inspection station 71. Block 63' of the induction coil and support means 60' (see FIGURE 6) accordingly supports within its notch 64' upwardly and outwardly diverging plane protective cover faces 68a' and 68b' respectively over first and second induction coils 51' and 52' in the impedance bridge 12' of FIGURE 7, the coils having a like number of similarly arranged convolutions, with those passes 51a' and 52a' on the sides of the coils most proximate to the notch 64' being in a plane of the coil and substantially parallel to each other from coil to coil with the passes 51a' and 52a' coextending in the coils at similar elevations in the notch for a magnetic ball to make at least one revolution in the second inspection station 71', the revolution being along the passes in the notch. Moreover, the planes of the protective cover faces 68a' and 68b' are substantially parallel to the respective planes of the passes 51a' and 52a' of the coils so that a magnetic ball can roll preferably for at least the aforementioned revolution within the flux paths of the coils of the second inspection station, transversely of these flux paths while supported by the faces 68a' and 68b', and relatively vary the magnitudes of the self-inductances of coils 51' and 52' as a function of trueness of surface form of the magnetic ball, and so that a magnetic ball thus rolling will follow a course which is substantially the same in direction as that of the passes 51a' and 52a' when the magnetic ball rolling within the flux paths of coils 51' and 52' is a substantially truly spherical ball. A magnetic ball thus rolled along notch 64' causes the impedance bridge circuit 12' to have for output a voltage which varies as a function of degree of trueness of surface form of the magnetic ball. This voltage is imposed upon clipper 113' which is set to conduct at a voltage which delineates between different surface grades in the manner hereinbefore mentioned with reference to clipper 113. The voltages at which clippers 113 and 113' delineate between surface grades of a magnetic ball illustratively may be the same.

Chute component 310 has an elbow 315 defined by legs 310a and 310b which preferably extend at about a right angle directionally with respect to each other and the elbow has an inner angular abutment 310c to engage a ball substantially tangentially for changing the axis of rolling of the ball by about a right angle directionally. As already mentioned the input end 310d of leg 310a is annexed to the output end 74d of power operated routing device 74 when the latter is in the upright position and accordingly the input end of the leg can receive a magnetic ball rolling from the routing device 74. Leg 310b has its output end 310e annexed to the input end of the support and induction coil means 60' in the second inspection station for a magnetic ball rolling from the chute component 310 to enter this inspection station and roll along faces 68a' and 68b'. Legs 310a and 310b of the chute component 310 moreover are respectively axially directionally aligned with the first and second inspection stations so that the chute component 310 will by effect of elbow 315 not only transfer a magnetic ball received from the first inspection station to the second inspection station but change the axis about which the magnetic ball rolls, the arrangement being so that a magnetic ball having rolled in the flux paths of the coils in the first inspection will be transferred by the chute component 310 to roll about an axis in flux paths of the coils in the second inspection station which differs by about a right angle directionally from the direction of an axis about which the ball rolled while being inspected in the first station.

In having motors and control valves similar to those of the power operated routing or chute device 74, the chute device 74' accordingly is equipped with pneumatic reject and return motors 83' and 84'. There are pneumatic fluid input and exhaust valves 154' and 155' (see FIGURE 7) connected with the power chamber of reject motor 84' and further there are pneumatic fluid input and exhaust valves 157' and 158' connected with the power chamber of return motor 83'. Pneumatic fluid under pressure sufficient to operate the motors 83' and 84' is supplied from a suitable source not shown, which source may if desired be the same source of supply as that for the motors 83 and 84 of chute device 74. Windings 154a', 155a', 157a' and 158a' (FIGURE 7) of the solenoids of the valves are in circuits with time delay 159' and A.C. supply 156 in the manner hereinbefore indicated with reference to time delay 159 and valves 154, 155, 157 and 158. Motors 83' and 84' have their cylinder walls mounted on trunnions 83c' and 84c' (FIGURE 6) as to the support 75 and the piston rods of the motors are pivotally connected at 83a' and 84a' to the routing or chute device 74' for these motors to drive this device between the upright and reject positions. In the reject position the device empties sidewise as to magnetic ball storage bin 321 and in the upright position empties endwise as to the magnetic ball storage bin 320.

By extending the conveying, inspection and routing system of FIGURES 1 to 4 in the manner indicated, the magnetic balls received by the power operated chute device 74 from the first inspection station 71 will be forwarded onto chute component 310 when the signal correspondingly from the first inspection station dictates that the upright position of chute device 74 be sustained as distinguished from the signal being a reject signal causing operation as hereinbefore described to route the magnetic ball to the reject bin 82. There is a gradient favoring movement by gravity from the input end 310d of chute component 310 to the longitudinal output end 74d' of the second power operated chute device 74', or the magnetic balls are otherwise suitably impelled, to promote rolling of each magnetic ball from the input end of the chute component, thence through change of axis of rolling in the elbow 315 and on one at a time through the flux paths of the induction coils in the second inspection station and crossing one at a time the second power operated chute device, thereafter following route in accordance with the dictates of the corresponding signal produced by the rolling about an axis in the second inspection station different than in the first inspection station. The second control circuit 10′ on receiving the signal from the second inspection station 71′ responds in a manner already described with reference to the control circuit 10. Where the signal from the second inspection station is of relatively low magnitude the second chute device 74′ remains in upright position and the magnetic ball corresponding to the signal is routed as being of superior grade into collection bin 320 for magnetic balls of this grade, and where the signal from the second inspection station is of a relatively high magnitude the magnetic ball corresponding to the signal causes the second power operated routing device to be laterally moved by operation of reject and return motors 83′ and 84′, thus rejecting the magnetic ball as being of inferior grade into collection bin 321 for that grade and returning to the upright position to accommodate the next magnetic ball from the second inspection station.

Rate of rolling maintained in the system as by proper gradient in the system is sufficient for a magnetic ball to travel from the inspection station in which it is being tested onto the related power operated chute device by when the reject motor 84 or 84′, as the case may be, overcomes lag in responding to the signal received and drives the corresponding chute device thereby effecting the rejection. The interval between each magnetic ball and the ensuing magnetic ball put into the system is, moreover, at least great enough for each power operated chute device to complete its cycle of operation from upright position to reject position and back to upright position in response to a signal before another magnetic ball can enter the chute device from the related inspection station for routing.

The magnetic balls rejected on the appropriate signals from the first and second inspection stations by the power operated chute devices 74 and 74′ accordingly are accumulated in the bins 82 and 321 and thus are distinguished as being of relatively inferior grade as compared with those magnetic balls which succeed in reaching bin 320, the latter balls having been accepted as being of better grade through inspection about axes of rolling differing with the stations.

As the present invention lends itself to many possible embodiments and as many possible changes may be made in the embodiments noted, it will be distinctly understood that all matter described herein is to be interpreted as illustrative and not as a limitation.

I claim:

1. Apparatus comprising means for supporting inspecting and routing a magnetic ball, said means including; electromagnetic means for producing magnetic fields wherein a magnetic ball is to act, means for sustaining a magnetic ball to roll interacting with said magnetic fields for at least one revolution and thereby produce electrical signals in said electromagnetic means having a magnitude differential with respect to each other varying with difference in surface form of a magnetic ball throughout said revolution, and power operated routing means controlled and arranged for giving a magnetic ball interacted with said magnetic fields a route which depends upon surface characteristics of the ball.

2. Apparatus as set forth in claim 1, wherein said means for sustaining a magnetic ball includes a pair of support members for a magnetic ball to roll for at least one revolution in simultaneous contact with said support members while interacting with said magnetic fields to produce said electrical signals.

3. Apparatus comprising means for supporting inspecting and routing a magnetic ball, said means including; electromagnetic means for producing magnetic fields in an inspection location, means comprising a pair of support members for a magnetic ball simultaneously to roll in contact with said support members and interact with said magnetic fields to produce electrical signals in said electromagnetic means having a magnitude differential with respect to each other varying with difference in surface form of a magnetic ball, and power operated routing means controlled and arranged for giving a magnetic ball interacted with said magnetic fields a route which depends upon surface characteristics of the ball.

4. Apparatus comprising means for supporting inspecting and routing a magnetic ball, said means including; electromagnetic means having coils for producing magnetic fields wherein a magnetic ball is to act, chute means having a pair of support members supporting said coils for a magnetic ball simultaneously to roll on said support members and interact with said magnetic fields for at least one revolution to produce electrical signals in said electromagnetic means having a magnitude differential with respect to each other varying with difference in surface form of a magnetic ball throughout said revolution, and power operated routing means controlled and arranged for giving a magnetic ball interacted with said magnetic fields a route which depends upon surface characteristics of the ball.

5. Apparatus comprising means for supporting and inspecting a magnetic ball, said means including; electromagnetic means for producing magnetic fields wherein a magnetic ball is to act, means for sustaining a magnetic ball to roll in interaction with said magnetic fields for at least one revolution and thereby produce electrical signals in said electromagnetic means having a magnitude differential with respect to each other varying with difference in surface form of a magnetic ball, and function differentiating means for producing throughout said revolution a function varying with the magnitude of said magnitude differential of said electrical signals and representing the difference in surface form of a magnetic ball.

6. Apparatus comprising means for supporting and inspecting a magnetic ball, said means including; electromagnetic means for producing magnetic fields wherein a magnetic ball is to act, means comprising a pair of support members for a magnetic ball simultaneously to roll in contact with said members and interact with said magnetic fields to produce electrical signals in said electromagnetic means having a magnitude differential with respect to each other varying with difference in surface form of a magnetic ball, and function differentiating means for producing a function varying with the magnitude of said magnitude differential of said electrical signals and representing difference in surface form of a magnetic ball.

7. Apparatus as set forth in claim 6, wherein said pair of support members and said magnetic fields are interrelated for a magnetic ball in contact with said support members to effect at least one revolution in said interaction with said magnetic fields.

8. Apparatus comprising means for supporting and inspecting a magnetic ball, said means including; electromagnetic means for producing first and second pairs of magnetic fields, and means for conveying a magnetic ball to roll in said first pair of magnetic fields and delivering the ball to roll in said second pair of magnetic fields in a different orientation relative to said second pair of magnetic fields than beforehand relative to said first pair of magnetic fields, and to have the rolling of a magnetic ball in the pair of magnetic fields characterized by having said magnetic fields of the pair and a magnetic ball interact for at least one revolution of the magnetic ball and thereby produce electrical signals in said electromagnetic means having a magnitude differential with respect to each other varying with difference in surface form of a magnetic ball throughout said revolution, and function differentiating means for producing a function varying with the magnitude of said magnitude differential of said electrical signals corresponding to the pair of said magnetic fields and representing difference in surface form of a magnetic ball.

9. Apparatus comprising means for supporting and inspecting a magnetic ball, said means including; electromagnetic means for producing magnetic fields wherein a magnetic ball is to act, and means for sustaining a magnetic ball to roll about a first axis of rolling in said magnetic fields and for diverting and conveying the ball to roll about a second axis of rolling in said magnetic fields, and the rolling of the magnetic ball about each of said axes in said magnetic fields being characterized by having said magnetic fields and a magnetic ball interact for at least one revolution of the magnetic ball and thereby produce electrical signals in said electromagnetic means having a magnitude differential with respect to each other varying with surface form of a magnetic ball throughout said revolution, and function differentiating means for producing a function varying with the magnitude of said magnitude differential of said electrical signals corresponding to said axis of rolling and representing difference in surface form of a magnetic ball.

10. Apparatus as set forth in claim 9, wherein said first and second axes differ by about a right angle directionally with respect to each other.

11. Apparatus comprising means for supporting and inspecting a magnetic ball, said means including; electromagnetic means for producing first and second pairs of magnetic fields wherein a magnetic ball is to act, and chute means for a magnetic ball to roll about a first axis of rolling in said first pair of magnetic fields and for diverting and conveying the ball to roll about a second axis of rolling in said second pair of magnetic fields, and the rolling of the magnetic ball about each of said axes being characterized by having the pair of said magnetic fields and a magnetic ball interact for at least one revolution of the magnetic ball and thereby produce electrical signals having throughout said revolution a magnitude differential with respect to each other varying in said electromagnetic means as the difference in surface form of a magnetic ball, and function differentiating means for producing a function varying with the magnitude differential of said electrical signals corresponding to the pair of said magnetic fields and representing difference in surface form of a magnetic ball.

12. Apparatus as set forth in claim 11, wherein said chute means includes an elbow for a magnetic ball to change in axis of rolling between said first and second pairs of magnetic fields through entering and leaving said elbow.

13. Apparatus as set forth in claim 12, wherein said chute means includes an approximately ninety degree elbow for a magnetic ball to change in axis of rolling by about ninety degrees through entering and leaving said elbow, and said first and second axes of rolling of a magnetic ball in said pairs of magnetic fields differ by approximately ninety degrees directionally with respect to each other.

14. Apparatus comprising means for supporting inspecting and routing a magnetic ball, said means including; electromagnetic means for producing magnetic fields wherein a magnetic ball is to act in each of first and second inspection locations, and means for sustaining a magnetic ball to roll for at least one revolution of inspection in said magnetic fields in said first inspection location and delivering the magnetic ball via a selective route to roll for at least one revolution of inspection in said magnetic fields in said second inspection location in a different orientation relative to said magnetic fields of said second inspection location than beforehand relative to said magnetic fields in said first inspection location and thence via selective route from said second inspection location, the rolling of a magnetic ball in said magnetic fields in the inspection location being characterized by having a magnetic ball and said magnetic fields interact and thereby produce electrical signals in said electromagnetic means having a magnitude differential with respect to each other varying with the difference in surface form of a magnetic ball throughout said revolution, and route selection being controlled for route of a magnetic ball from the inspection location to be according to surface characteristics of the magnetic ball.

15. Apparatus as set forth in claim 14, wherein said electromagnetic means produces first and second pairs of said magnetic fields in first and second inspection locations respectively, and said means for sustaining a magnetic ball to roll and delivering the magnetic ball to roll includes chute means extending between said locations, said chute means having an elbow for changing the axis of rolling of a magnetic ball between said locations.

16. Apparatus as set forth in claim 15, wherein said axes of rolling of a magnetic ball in said magnetic fields of the locations differ by about a right angle directionally with respect to each other and said elbow is about a right angle elbow for a magnetic ball to change in axis of rolling by about ninety degrees through entering and leaving said elbow.

17. Apparatus comprising means for supporting, inspecting and routing a magnetic ball, said means including; means for electromagnetically producing magnetic fields in each of first and second inspection locations and for sustaining a magnetic ball to roll and interact with said magnetic fields in the location and thereby relatively vary electrical signals in magnitude with respect to each other in said electromagnetic means as a function of difference in surface form of a magnetic ball, axis transfer and routing means comprising power operated first routing means controlled and arranged for giving a magnetic ball interacted with said magnetic fields in said first inspection location a route which leads to said second inspection location, for situations where the maximum value of the relative variation of the electrical signals with respect to each other produced by the interaction in said first inspection location is relatively large, or a route which leads to a destination other than to said second inspection location, for situations where said maximum value of the relative variation of the electrical signals with respect to each other in said first inspection location is relatively small, and axis transfer means arranged for diverting a magnetic ball to a different axis of rolling and for a magnetic ball given a route from said first inspection location to said second inspection location by said power operated first routing means to roll about a different axis in said second inspection location than beforehand in said first inspection location; and the apparatus further including power operated second routing means arranged for giving a magnetic ball interacted with said magnetic fields in said second inspection location a route which depends upon surface characteristics of the magnetic ball.

18. Apparatus as set forth in claim 17, wherein said means for sustaining a magnetic ball to roll in said magnetic fields in the location includes chute structure for a magnetic ball rolling upon said chute structure to interact with said magnetic fields in the location and vary electrical signals relatively to each other in said electromagnetic means as a function of difference in surface form of a magnetic ball.

19. Apparatus as set forth in claim 17, wherein said chute structure includes in each of said inspection locations a pair of support members for a magnetic ball simultaneously to roll in contact with said support members in the inspection location and interact with said magnetic fields in the inspection location for at least one revolution and thereby produce electrical signals having a magnitude differential with respect to each other varying with difference in surface form of a magnetic ball through said revolution for controlling routing of the magnetic ball from the inspection location.

20. Apparatus as set forth in claim 19, wherein said axis transfer means includes a chute elbow, for a magnetic ball in rolling within said elbow during movement from said first inspection location to said second inspection location to transfer to a different axis of rolling.

21. Apparatus as set forth in claim 20, and further including conveying means for conveying magnetic balls in sequence and communicating with said first inspection location for the magnetic balls to be sequentially introduced to roll in said magnetic fields in said first inspection location and be routed.

22. In a method of appraising a magnetic ball as to trueness of surface form, the steps which include, interacting a rolling magnetic ball with magnetic fields while having discrete regions of said magnetic ball tracking on laterally opposite members, and thus producing electrical signals having a differential in magnitude with respect to each other varying with difference in surface form of said magnetic ball, and appraising said magnetic ball as to trueness of surface form on the basis of magnitude of said differential during said interaction.

23. In a method of appraising a magnetic ball as to trueness of surface form as set forth in claim 22, wherein said magnetic ball revolves having said differential vary with difference in surface form of said magnetic ball for at least one revolution of said magnetic ball.

24. In a method of appraising a magnetic ball as to trueness of surface form, the steps which include rolling a magnetic ball for at least one revolution about each of different axes in interaction with magnetic fields to produce electrical signals having a differential in magnitude with respect to each other varying with difference in surface form of said magnetic ball, and during said rolling about each of said axes appraising said magnetic ball as to trueness of surface form on the basis of magnitude of said differential.

25. In a method of appraising a magnetic ball as to trueness of surface form as set forth in claim 24, wherein said magnetic ball is rolled in said interaction with said magnetic fields while having discrete regions tracking on laterally opposite members.

References Cited

UNITED STATES PATENTS

| 2,331,418 | 10/1943 | Nolde. | |
| 2,570,485 | 10/1951 | Rieber | 209—74 X |
| 2,989,179 | 6/1961 | Woods et al. | 209—81 X |
| 3,252,084 | 5/1964 | Krobath | 324—40 |

FOREIGN PATENTS

| 635,848 | 4/1950 | Great Britain. |

M. HENSON WOOD, Jr., *Primary Examiner.*

J. N. ERLICH, R. A. SCHACHER, *Assistant Examiners.*